United States Patent [19]

Kettner

[11] 4,322,307
[45] Mar. 30, 1982

[54] PROCESS FOR ALLEVIATING SULFUR DEPOSITION IN SOUR GAS WELLS

[75] Inventor: Roland Kettner, Heist, Fed. Rep. of Germany

[73] Assignee: Mobil Oil Corporation, New York, N.Y.

[21] Appl. No.: 170,422

[22] Filed: Jul. 21, 1980

[30] Foreign Application Priority Data

Oct. 15, 1979 [DE] Fed. Rep. of Germany ....... 2941728

[51] Int. Cl.$^3$ ............................................. E21B 43/00
[52] U.S. Cl. ................................ 252/8.55 B; 166/312; 299/5
[58] Field of Search ................. 252/8.55 B; 299/5; 166/312

[56] References Cited

U.S. PATENT DOCUMENTS

| | | | |
|---|---|---|---|
| 3,070,162 | 12/1962 | Barnard | 166/312 X |
| 3,172,473 | 3/1965 | Crowley et al. | 252/8.55 |
| 3,223,156 | 12/1965 | Peter | 166/310 X |
| 3,393,733 | 7/1968 | Kuo et al. | 299/5 X |
| 3,498,887 | 3/1970 | McClintock et al. | 299/5 X |
| 3,531,160 | 9/1970 | Fisher | 299/5 |
| 3,909,422 | 9/1975 | Sample | 166/312 X |

FOREIGN PATENT DOCUMENTS

771129 11/1967 Canada.
1173856 7/1964 Fed. Rep. of Germany.

OTHER PUBLICATIONS

"Sulfur Plugging Whipped in Gas Wells", article in *The Oil And Gas Journal*, Apr. 17, 1967, pp. 113 and 114.

*Primary Examiner*—Herbert B. Guynn
*Attorney, Agent, or Firm*—Charles A. Huggett; James F. Powers, Jr.; Lawrence O. Miller

[57] ABSTRACT

Process for treating a well penetrating a subterranean formation which is productive of sour gas in order to alleviate sulfur deposition. An alkyl naphthalene base sulfur solvent is circulated into the well and recovered from the well in admixture with the produced gas. The injected solvent comprises an alkyl naphthalene mixture containing $C_1$-$C_4$ alkyl naphthalenes in an amount within the range of 70-90 weight percent and higher-boiling naphthalenes in an amount within the range of 5-15 weight percent. The sulfur solvent contains no more than a 10 weight percent of naphthalene and has an initial boiling point of at least 230° C., a flash point greater than 101° C., and a freezing point of less than 0° C. The solvent mixture may be dissolved in a carrier oil for introduction into the well.

2 Claims, 1 Drawing Figure

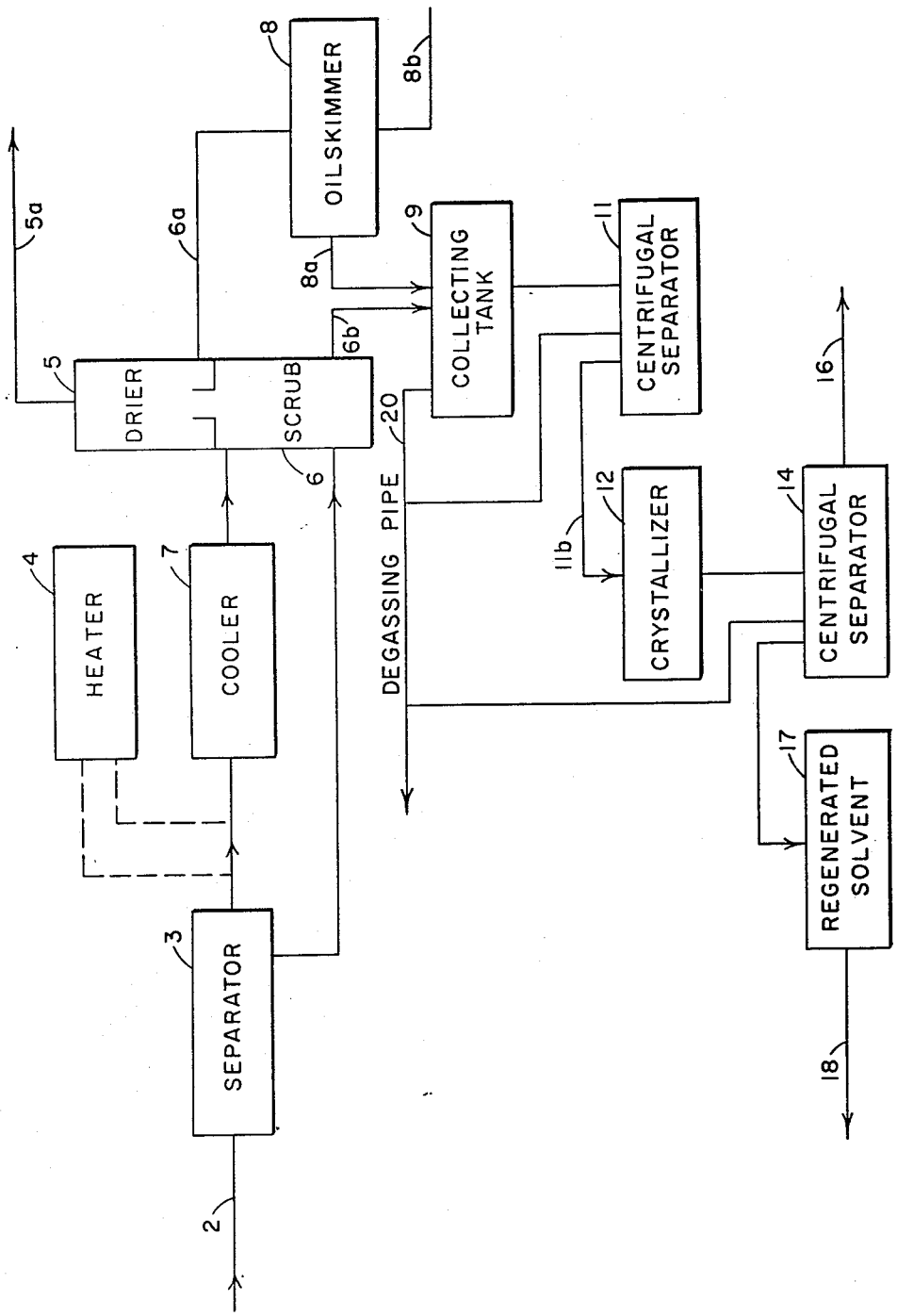

PROCESS FOR ALLEVIATING SULFUR DEPOSITION IN SOUR GAS WELLS

BACKGROUND OF THE INVENTION

This invention relates to a process for alleviation of sulfur deposition in sour gas wells and more particularly to a process for treating sour gas wells by the introduction of an alkyl naphthalene base sulfur solvent into the well.

In many cases the production of natural gas is complicated by the presence of hydrogen sulfide in the subterranean formation in which the gas is found. Natural gas containing appreciable amounts of hydrogen sulfide is commonly referred to as "sour gas." In addition to the problems caused by the toxicity of hydrogen sulfide, serious problems are presented by sulfur deposition. Under the conditions prevailing in the subterranean reservoir, the sulfur may be partially dissolved in the compressed gas or finely divided in a liquid phase and may partially or wholly chemisorbed as hydrogen polysulfide (sulfane). In any event, the decrease in temperature and pressure attendant to the upward flow of gas as it is produced to the surface, as well as catalytic effects, result in the separation of elemental sulfur from the gas. A solid precipitate of sulfur may form in certain critical places such as on the interior wall of the production string, thus restricting or actually plugging the flow passageway.

Various processes have been proposed for the prevention or removal of such sulfur precipitates. These include intermittently applied measures such as mechanical removal of sulfur deposits or the batchwise application of liquids having high sulfur absorption power. Such measures of necessity involve interrupting the operation of the well. The more widely applied procedures involve the continuous processes. In these procedures, sulfur deposition is prevented by absorbing elemental sulfur by chemical or physical dissolution in a medium which is produced with the gas stream and is then separated from the gas stream by any suitable technique. There are many substances which in the liquid phase are useful in dissolving sulfur. However, in order to be useful in sour gas wells, such substances should meet a number of criteria. They should be capable of rapid binding of sulfur and should be nonflammable and nontoxic. The solvents should not damage the formation and should exhibit chemical and thermal stability under the process conditions. In addition, they should be compatible with the downstream surface equipment and capable of regeneration without excessive losses. Suitable solvents also should be readily separable from the produced gas and resistant to emulsification with entrained water and normally should have a density differential relative to water of at least 0.05.

German Pat. Nos. 1,157,569, 1,164,345, and 1,296,586, and U.S. Pat. Nos. 3,223,156 and 3,909,422 disclose, for example, the use of alkali, ammonia or amine solutions which in the presence of hydrogen sulfide form sulfides and bind elemental sulfur as polysulfide. Surface-active agents also may be added in order to improve the sulfur binding properties. The alkali, ammonia, or amine sulfides function to dissolve sulfur; but if carbon dioxide is present in the sour gas, as is often the case, the corresponding carbonates are also formed. Thus, the application of these solvents is limited to sour gas wells having a relatively favorable $H_2S:CO_2$ ratio of about 0.7 to 1.5. Moreover, these processes are not applicable where formation waters produced by the well contain alkaline-earth metal chlorides such as calcium and magnesium chlorides. In this case where the alkaline aqueous medium also contains carbon dioxide, calcium carbonate and magnesium hydroxide deposits may also result in plugging of the production equipment.

Solvents which have heretofore been proposed for use in preventing sulfur deposition include liquid hydrogen sulfide (U.S. Pat. No. 3,393,733), carbon disulfide (Canadian Pat. No. 771,129), organic sulfides and disulfides (U.S. Pat. No. 3,531,160) and disulfides (German published patent application No. 2,422,098). These processes involve disadvantages due to the dangers in handling the chemicals and difficulties in gas-processing plants because of the formation of nonregenerable products in purification processes using alkanolamines or because of the high volatility of the substances employed. The use of tetraline as a sulfur solvent is disclosed in German Pat. No. 1,225,977. However, this process presents difficulties because of the attendant high vapor pressure and the reaction under borehole conditions with elemental sulfur to produce naphthalene.

German Pat. No. 1,173,856 discloses the use of high-boiling mineral oil hydrocarbon mixtures of spindle oil type. Relatively large quantities of such solvents are required because of the relatively low solubility of sulfur therein. In regenerating the solvent, the dissolved sulfur is extracted by scrubbing with alkali hydrogen sulfide solutions or alkanolamine solutions (German published patent application No. 2,707,057). In this procedure, surface-active substances are used as emulsion breakers and to facilitate the transfer of sulfur from the organic phase into the aqueous phase.

Hydrocarbon solvents such as benzene, toluene, xylene, kerosene or diesel oil are not generally useful in the alleviation of sulfur deposition because of the high volatility of these substances. Other possible solvents such as hydrocarbon halides as well as various esters are hydrolyzed under borehole conditions and form highly corrosive decomposition products. Certain polycyclic aromatics such as naphthalene, $\alpha$-, or $\beta$-naphthol, and anthracene have relatively high melting points, exhibit a tendency to form deposits in low-temperature portions of the production system, or have unacceptably high vapor pressures. Hydrocarbon mixtures such as coal tar oils and various high-boiling mineral oil fractions tend to undergo decomposition reactions in the presence of elemental sulfur which result, among other things, in the formation of insoluble asphalt-like products and in the formation of carbon sulfide and carbonyl sulfide. The carbon sulfide and carbonyl sulfide present difficulties in the downstream treatment and processing system and the higher-molecular weight decomposition products cause difficulty in the regeneration of solvents and, in addition, may act as plugging agents.

SUMMARY OF THE INVENTION

In accordance with the present invention there is provided a new and improved process for treating a well penetrating a subterranean formation which is productive of sour gas. In carrying out the invention, an alkyl naphthalene base sulfur solvent is circulated into the well and recovered from the well in admixture with the produced gas. The injected solvent comprises an alkyl naphthalene mixture containing $C_1$–$C_4$ alkyl naphthalenes in an amount within the range of 70–90 weight percent and higher-boiling naphthalenes in an amount within the range of 5-15 weight percent. The sulfur solvent contains no more than a 10 weight percent of naphthalene and has an initial boiling point of at least 230° C., a flash point greater than 101° C., and a freezing point of less than 0° C.

BRIEF DESCRIPTION OF THE DRAWING

The drawing is a schematic illustration of a system for recovering sulfur from a sour gas well treated in accordance with the present invention and for regenerating sulfur solvent.

DESCRIPTION OF SPECIFIC EMBODIMENTS

As noted previously, many subterranean gas-producing reservoirs contain hydrogen sulfide and also elemental sulfur dissolved therein in addition to hydrocarbon gases such as methane and ethane as well as other gases such as carbon dioxide and nitrogen. The reservoir may also contain formation brine which is produced along with the sour gas. The brine may contain monovalent metal salts such as sodium chloride and also divalent metal salts such as calcium and magnesium chlorides.

Typically, the production well extending from the surface of the earth to the subterranean productive formation is equipped with a tubing string through which the sour gas entering the well from the formation is produced to the surface. Fluid may be circulated into the well by any suitable technique such as by injection through the annulus defined by the production tubing and well casing or through a second tubing string running parallel to the production string. In any case in carrying out the present invention, the alkyl naphthalene mixture described above is pumped down the well and ultimately brought into admixture with the produced sour gas. The alkyl naphthalene solvent is then produced to the surface through the production stream along with the sour gas.

The sulfur solvent employed in the present invention can be readily separated from the gas at the surface and is readily regenerable and chemically stable under the conditions prevailing in the producing well and in the surface processing system.

In a preferred embodiment of the invention, the alkyl naphthalene mixture is added to a carrier oil. By circulating the alkyl naphthalene mixture into the well in the carrier oil, a sufficient density differential can be achieved in order to readily accommodate separation of the solvent phase from entrained water contained in the production fluid. Preferably, the concentration of the alkyl naphthalene mixture in the carrier oil is within the range of 10-60 weight percent. The carrier oil should have a relatively high-boiling point and be chemically and thermally stable under the conditions prevailing in the well and surface treating equipment. Suitable carrier oils take the form of hydrocarbon found in mineral oil fractions. A preferred carrier oil exhibits a boiling range of from 280°-400° C., a specific gravity within the range of 0.85-0.9 and a viscosity at 20° C. within the range of 14-30 centistokes. Suitable alkyl naphthalene solvents for mixtures containing quinoline bases. A preferred sulfur solvent is an alkyl naphthalene mixture made up predominately of methylnaphthalenes and dimethylnaphthalenes. More specifically, this solvent contains methylnaphthalenes within the range of 30-50 weight percent, dimethylnaphthalenes within the range of 30-50 weight percent, higher-boiling naphthalenes in an amount within the range of 5-10 weight percent, and naphthalene in an amount of about 5 weight percent.

Turning now to the drawing, there is illustrated a surface-processing installation in which the alkyl naphthalene solvent is regenerated by cooling and phase separation. The produced fluid is recovered from the wellhead and the solvent together with entrained water is separated from the gas in a high pressure separator. The gas effluent from the separator is substantially free of elemental sulfur and solvent residue and is passed on for further processing. Dissolved hydrogen sulfide is separated from the liquid phase by stripping or degassing and the liquid phase is subjected to a regeneration process. In this process most of the dissolved sulfur is precipitated by cooling and then separated by any suitable means such as centrifuging, filtration or decanting. The separation of solvent and water is carried out by any suitable technique such as through the use of centrifuges, baffleplate separators, settling vessels, etc. The resulting regenerated solvent can then be reused. If desired, the solvent can be heated in counter-current flow with the sulfur laden liquid separated in the aboveground processing system.

More specifically and with reference to the drawing, the produced gas containing the sulfur solvent employed in accordance with the present invention is recovered from the well (not shown) and the production stream is passed via a gathering line 2 to a high pressure separator 3. The gaseous effluent from the separator 3 is then passed via the cooler 7 (for special operating conditions, for example start-up of a gas well, a heater 4 is necessary) to a further separator 6 (SCRUB) which separates the liquid formed by condensation out of the gas by cooling. The gas is passed through the drying apparatus 5 (DRIER) and is withdrawn via line 5a for further processing. The drying agents such as glycols are applied to an oil skimmer 8 via line 6a. The sulfur solvent is passed from the oil skimmer 8 via line 8a to a collecting tank 9 and the drying agent may be removed via line 8b and applied to a suitable regeneration system (not shown). The relatively heavy sulfur laden solvent is removed from the bottom of separator 6 via line 6b and also passed to collecting tank 9. The liquid phase is then withdrawn from collecting tank 9 and applied to a separator 11 where final separation of solvent and water takes place. The water is withdrawn from the separator to a suitable disposal facility (not shown) suitable disposal facility (not shown) and the sulfur laden solvent is withdrawn via line 11b and applied to a crystallizer 12 where the sulfur is crystallized under suitable cooling conditions. The resulting sulfur-solvent slurry is then passed to a centrifugal separator 14. Sulfur from the separator is delivered via line 16 to a suitable sulfur disposal facility (not shown) and regenerated solvent from the separator is circulated to a make-up zone 17 where it is mixed with such fresh solvent and inhibitors as may be necessary. The resulting solvent solution is then circulated via line 18 for injection down the well. Gas from the collecting tank 9, separator 11 and separator 14 is disposed of through a degassing pipe 20.

What is claimed is:

1. In a process for alleviating sulfur deposition in a well penetrating a subterranean formation and producing sour gas wherein a sulfur solvent is circulated into said well and produced from said well with said gas, the improvement comprising employing as said solvent an alkyl naphthalene mixture containing $C_1$-$C_4$ alkyl naphthalenes in an amount within the range of 70-90 weight percent, higher-boiling naphthalenes in an amount within the range of 5–15 weight percent, and containing no more than 10% by weight of naphthalene, said mixture having an initial boiling point of at least 230° C., a flash point greater than 101° C., and a freezing point of less than 0° C., said solvent admixed with a hydrocarbon carrier oil in a concentration within the range of 10–60 weight percent, said carrier oil having a boiling range of from 280°–400° C., a specific gravity within the range of 0.85–0.9 and a viscosity at 20° C. of from 14–30 centistokes.

2. The method of claim 1 wherein said alkyl naphthalene mixture contains methylnaphthalenes within the range of 30–50 weight percent, dimethylnaphthalenes within the range of 30–50 weight percent, higher-boiling naphthalenes in an amount within the range of 5–10 weight percent, and naphthalene in an amount of about 5 weight percent.

* * * * *

UNITED STATES PATENT AND TRADEMARK OFFICE
CERTIFICATE OF CORRECTION

PATENT NO. : 4,322,307
DATED : March 30, 1982
INVENTOR(S) : Roland Kettner

It is certified that error appears in the above-identified patent and that said Letters Patent are hereby corrected as shown below:

Column 4, line 47 - Delete the following: "suitable disposal facility (not shown)"

Signed and Sealed this

Twenty-fifth Day of May 1982

[SEAL]

Attest:

Attesting Officer

GERALD J. MOSSINGHOFF
Commissioner of Patents and Trademarks